Dec. 22, 1959   J. P. CHAYKA   2,917,978
SURFACE BROACHING MACHINES
Filed April 29, 1957   4 Sheets-Sheet 1

INVENTOR.
JOSEPH P. CHAYKA
BY
ATTORNEY

United States Patent Office 2,917,978
Patented Dec. 22, 1959

2,917,978

SURFACE BROACHING MACHINES

Joseph P. Chayka, Rochester, Mich., assignor to Detroit Broach & Machine Company, Rochester, Mich., a corporation of Michigan Application April 29, 1957, Serial No. 655,758

3 Claims. (Cl. 90—33)

This invention relates to improvements in surface broaching machines of the type disclosed in U.S. Patent No. 2,190,642 having a reciprocating broaching slide carrying a broaching tool along a given path and incorporating a work carrying slide adapted to advance and carry work thereon into broaching position, hold the work firmly in broaching position during the broaching cut, and then retract and carry said work thereon from said broaching position, and, in particular, this invention relates to improvements in and simplification of the work carrying slide mechanism and its operation.

In surface broaching machines, it is well known that the reaction of the cutting force exerted on the work by the broaching tool is resolved into a vertical or cutting component and into a horizontal or push-off component. The said vertical or cutting component causes the teeth of the broaching tool to accomplish their broaching cut on the work being broached while the horizontal or push-off component tends to move the work carrying slide away from the broaching tool.

In the broaching machine disclosed in U.S. Patent No. 2,190,642, the work carrying slide is connected through relatively complicated linkage to a crankshaft which is rotated through a given angular distance to and from a dead center position whereby to advance and retract the work carrying slide to move work clamped or otherwise removably fixed thereon into and out of the path of the broaching tool. In this construction, the work carrying slide contacts a positive stop just before the operating crank which moves it arrives at a dead center position, and, when the crank continues to move to dead center, it further urges the work carriage against the stop by a force directionally opposite to the push-off force exerted by the broaching tool when accomplishing a broaching cut on the work clamped on the work carrying slide. This advance forward movement of the slide after it contacts its stop pre-loads the entire work carriage construction including its operating mechanism and its supports, sometimes collectively called the "knee construction," against the said push-off component of the cutting force exerted on the work by the broaching tool.

Such surface broaching machines have been more or less commercially successful, but, due to the complicated linkages employed and other inherent faults, the carriage operating mechanism was not considered reliable. Certain improvements were made thereon as disclosed and claimed in U.S. Patent No. 2,372,825 wherein the linkage between the crankshaft and the work carrying slide was somewhat simplified by employing a work carrying slide operating a crank connected to a transverse slide block mounted in a transverse slot or ways formed in the bottom of the work carrying slide. This construction, although a specific step forward over Patent No. 2,190,624, has not proved to be entirely satisfactory because of the necessity of using a transverse slide block connection between the power crank and the work carrying slide, and because of the tendency for the work carrying slide to lock when the crank mechanism is forced into a dead center relationship when the work carrying slide is advanced to its pre-load position after having first contacted a stop.

Accordingly, and with the foregoing in view, the primary object of this invention is to provide improved knee construction for surface broaching machines employing a still different and greatly simplified and improved means for reciprocating the work carrying slides or work carriages thereof which applies prestressing forces within the knee construction and work carrying slide reciprocating mechanism without the usual attendant hazard of its locking when and as the work carrying slide is urged into its advanced pre-stressed position, and which eliminates the sliding frictional connection between the work carrying slide and its reciprocating means together with the adverse effects of any malfunctioning thereof.

A further object of the invention is to provide improved knee construction for surface broaching machines and the like wherein rapid and efficient movement of work carrying slides for carrying work into and out of cutting position is accomplished with a minimum of mechanism and with a positive pre-loading of the knee construction, all without any possibility of locking the work carrying slide operating mechanism in its pre-load position.

A further object of the invention is to provide an improved knee construction for surface broaching machines wherein the work carrying slide operating mechanism may be easily and readily adapted to apply more or less pre-stressing to the knee and the work carrying slide when said work carrying slide and work thereon is advanced to its broaching position.

Other objects of the invention will become apparent by reference to the following detailed description taken in connection with the accompanying drawings, in which.

Figure 1:
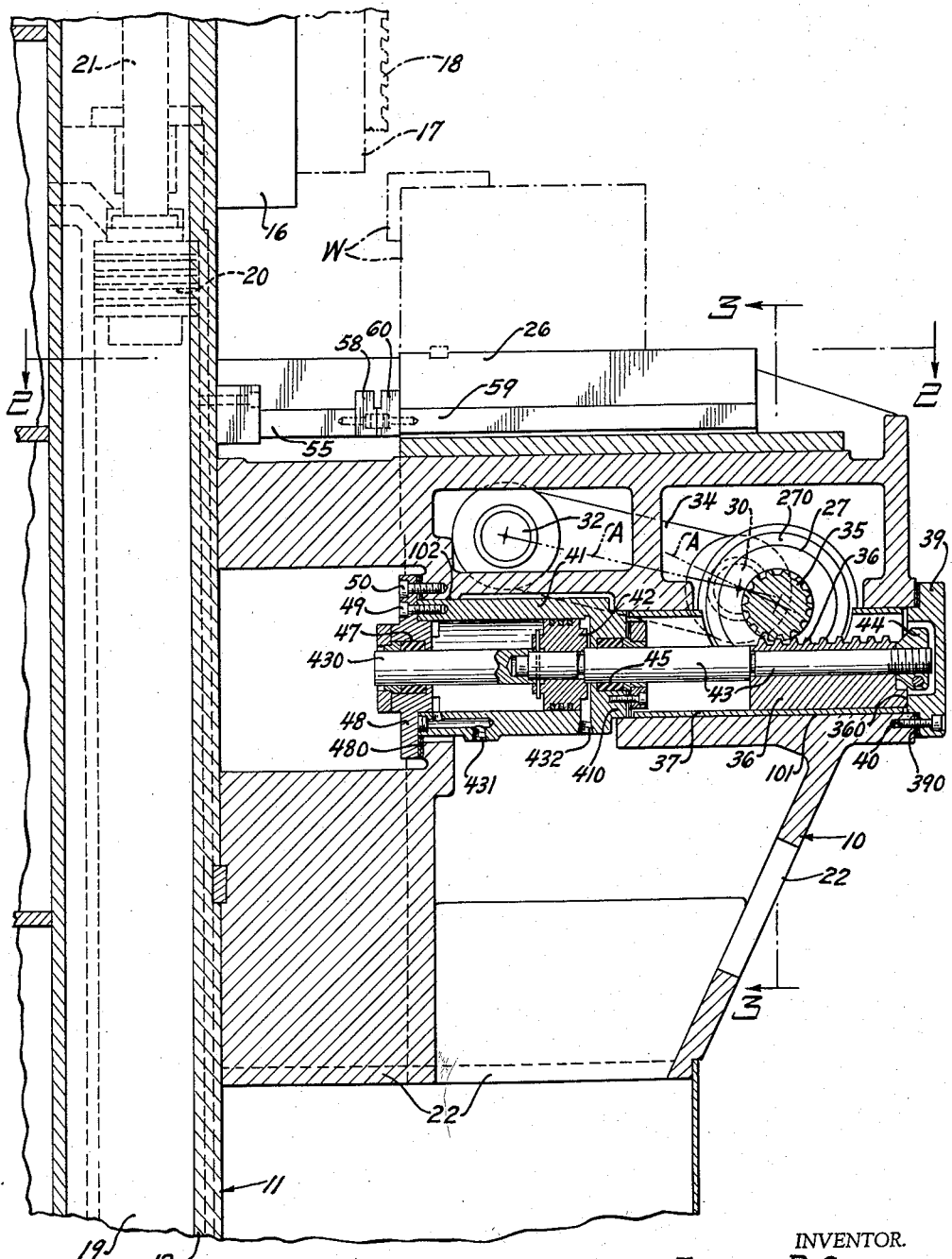
Fig. 1 is a fragmentary vertical sectional view of a surface broaching machine incorporating knee construction embodying the invention.

Referring now to the drawings wherein like reference numerals refer to like and corresponding parts throughout the several views, the invention consists of improved knee construction 10 usable with surface broaching machines 11 or the like. A typical double ram vertical broaching machine 11 indicated in the drawings for illustrative purposes consists generally of a frame 12 having laterally adjacent pairs of broaching slide ways 13 and 14 into which broach carrying slides 15 and 16 respectively are slidably mounted. The broach or tool carrying slide 16 is indicated in Fig. 1 in its Up position. Each broaching slide 15 and 16 carries a suitable broach mounting element 17 and a broach 18, and each broach or tool carrying slide 15 and 16 is preferably reciprocated by hydraulic means such as a hydraulic cylinder 19 having a piston 20 connected to the slide by a piston rod 21. Obviously, the broach or tool carrying slides 15 and 16 may be operated mechanically rather than hydraulically, and, if desired, knee construction embodying the invention may be adapted to a single ram as well as a double ram surface broaching machine. Also, broaching machines with which the invention is employed may be of a horizontal slide type rather than the vertical slide type as indicated in the drawings.

The knee construction 10 structurally may consist of a knee or bracket 22 bolted or otherwise secured to the frame 12 of the broaching machine 11. The said knee 10 is provided with suitable pairs of work carrying slide ways 23 and 24. Each pair of work carrying slide ways 23 and 24 are preferably centrally aligned with the pairs of broaching slide ways 13 and 14 respectively, and are angularly disposed in respect thereto, usually at 90 degrees. Work carrying slides 25 and 26 are slidably mounted in the said work carrying slide ways 23 and 24 respectively.

A crankshaft 27 disposed normal to the direction of movement of the work carrying slides 25 and 26 preferably provided with enlarged concentric longitudinally spaced bearing hubs 270 is journaled on suitable sleeve bearings 28 mounted in the said knee 22 on an axis parallel to the plane of travel of the said work carrying slides 25 and 26. The crankshaft 27 is provided with cranks in the form of crank pins 29 and 30 extending from the end faces of bearing hubs 270 thereof. The said cranks 29 and 30 are preferably disposed on the longitudinal center of the work carrying slides 25 and 26 respectively, and are angularly related with respect to each other at an angle less than 180 degrees. The said work carrying slides 25 and 26 are each provided with depending tongues 250 and 260 respectively mounting transversely disposed wrist pins 31 and 32, also respectively, which wrist pins are located near the inner end of the said work carrying slides and below the top thereof. Linkage bars 33 and 34 connect thee ranks 29 and 30 to the wrist pins 31 and 32 respectively whereby angular movement of the crankshaft 27 less than 180 degrees simultaneously moves the work carrying slides 25 and 26 and work W removably fixed thereon into and out of broaching position with respect to the broaches 18 carried by the broaching slides 15 and 16 respectively.

A pinion 35 is preferably formed in the central portion of the crankshaft 27, and a rack 36 is slidably mounted in an elongated arcuate bearing 37 fixed in the bottom of a bore 101 provided in the knee bracket 100. The said rack 36 meshes with the pinion 35 so that a limited reciprocation of the said rack 36 turns the crankshaft 27 a suitable angular distance causing the cranks 29 and 30 and the linkage bars 33 and 34 to move the work carrying slides 25 and 26 and work W thereon into and out of broaching position with respect to the broaching slides 15 and 16 respectively. An end cap 39 is provided over the right hand end of the bore 101 in the knee bracket 100 as viewed in Fig. 4. The said end cap 39 is secured to the knee bracket 100 by means of suitable studs 40. The end 360 of the rack 36 contacts the said end cap 39 to limit the movement of the rack 36 to the right as viewed in Fig. 4.

The rack 36 is reciprocated in its elongated arcuate bearing 37 by means of a double acting hydraulic cylinder 41 including a piston 42 therein rigidly connected by a suitably shouldered piston rod 43 and securing nut 44 to the said rack 36. Since the end cap 39 over the bore 101 in the knee bracket 100 limits the movement of the rack 36 to the right as shown in Fig. 4, and, since the said piston 42 is rigidly connected to the rack 36, the limit of the movement of both the piston 42 and the rack 36 to the right as shown in Fig. 4 is controlled by the said end cap 39 functioning as a stop.

Figure 4:
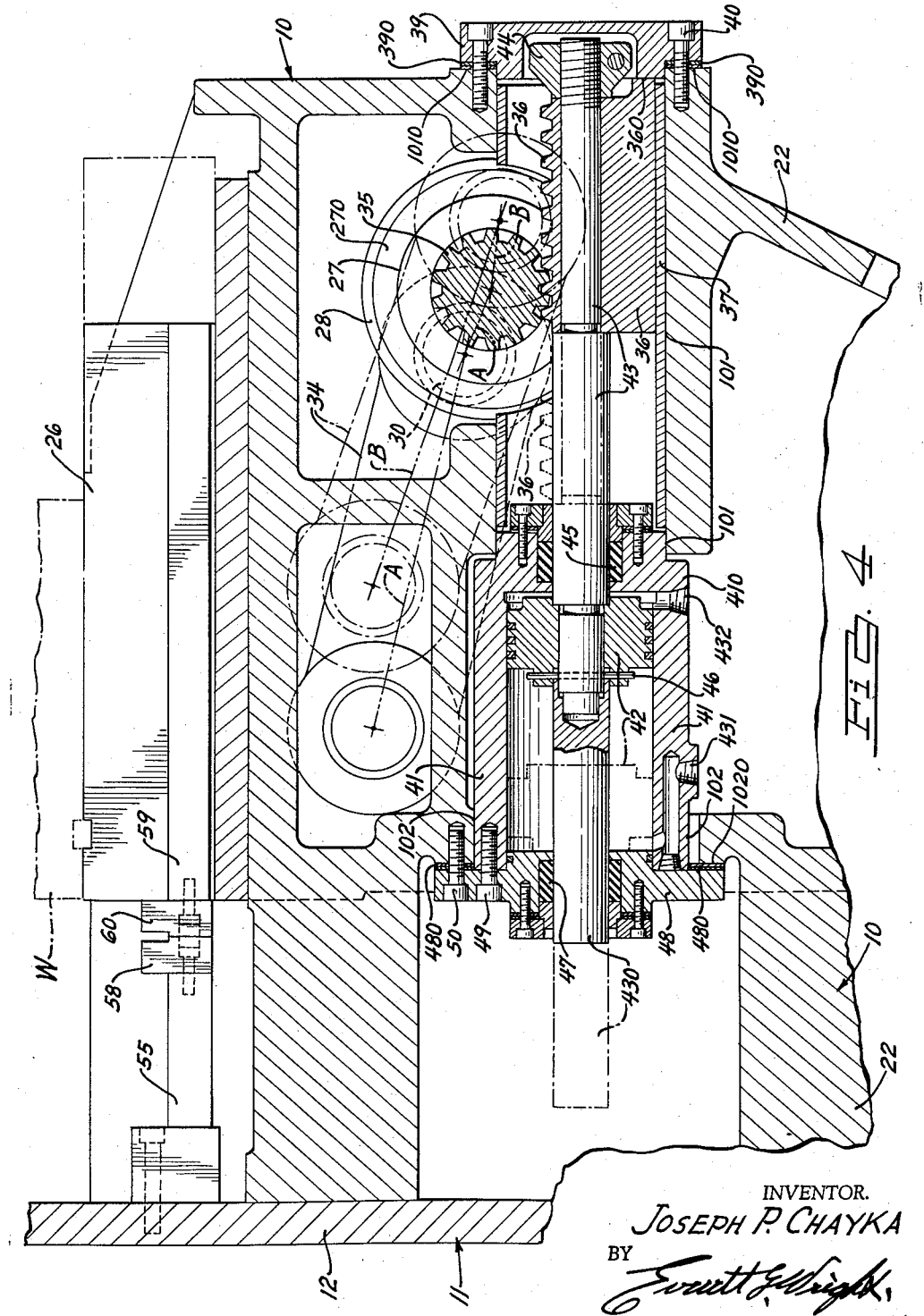
Fig. 4 is an enlarged fragmentary sectional view taken substantially on the line 4—4 of Fig. 2.

The double acting hydraulic cylinder 41 is preferably provided at its right hand end as viewed in Fig. 4 with an integral end cap 410 having a packing gland 45 therein through which the piston rod 43 extends. The periphery of the outer end of the said end cap 410 is suitably formed to telescopingly fit into the left hand end of the said bore 101 provided in the knee bracket 100. A piston rod extension 430 is preferably connected to the piston 42 by means of a pin 46 and extends through a packing gland 47 provided in a combined end cap and mounting plate 48 secured by studs 49 to the left hand end of the hydraulic cylinder 41 as viewed in Fig. 4.

The said left hand end of the hydraulic cylinder 41 is telescopingly mounted in a bore 102 provided in the knee bracket 100 in axial alignment with the bore 101 therein, and the said hydraulic cylinder 41 is secured to the said knee bracket 100 by means of the said combined end cap and mounting plate 48, and suitable studs 50. This construction hydraulically seals and hydraulically balances the said double acting hydraulic cylinder 41, and also limits the unitary movement of the piston 42, the piston rod 43 and the rack 36 to the left as viewed in Fig. 4.

By the employment of suitable shims 390 between the end cap 39 and the anular face 1010 provided in the knee 100 around the bore 101 therein, and by the employment of suitable shims 480 between the combined mounting plate and end cap 48 and the annular face 1020 provided in the knee 100 around the bore 102 therein, all as best shown in Fig. 4, the stroke of the piston 42 and the rack 36 is limited so that the crankshaft 27 moves less than 180 degrees causing the crank pins 29 and 30, the wrist pins 31 and 32 and the linkage bars 33 and 34 respectively to always assume a less than dead center position, as indicated by the double dot and single dash lines A and B, when the work carrying slides 23 and 24 respectively are moved into and out of broaching position responsive to reciprocation of the rack 36 by the double acting hydraulic cylinder 41. Hydraulic fluid under pressure to operate the hydraulic cylinder 41 may be supplied thereto alternately at opposite ends of the piston 42 thereof through suitable ports 431 and 432, the same ports also serving alternately as return ports if desired.

In Fig. 4, the work carrying slide 26, the crank pin 30, the wrist pin 32 and the linkage bar 34 are shown in full and dotted lines in the position they assume when the work carrying slide 26 is advanced by the hydraulic cylinder 41, the rack 36 and pinion 35 to its broaching position. The same elements are indicated in dot and dash lines in the position assumed by them when the work carrying slide 26 is retracted to its work loading and unloading position. Except for the fact that the crank pin 31 is located in sufficient angular relationship to the crank pin 30 to phase the movement of the work carrying slide 25 out of and into broaching position while the work carrying slide 26 is moving into and out of broaching position, the several elements operating the work carrying slide 25 from the crank pin 31 are like and similar to the several elements operating the work carrying slide 26 hereinbefore described in detail. Obviously, then, in a single ram broaching machine, one broaching slide and one work carrying slide together with their operating elements would be omitted.

Since hydraulic circuits for operating broaching machines of the type disclosed are relatively old in the art, the hydraulic circuit for supplying hydraulic fluid under pressure to the hydraulic cylinders 19 operating the broaching slides 15 and 16 and the hydraulic cylinder 41 operating the work carrying slides 25 and 26 need not be shown or described in detail. It is sufficient to point out that the hydraulic circuit is preferably arranged in a dual ram and dual work carrying slide broaching machine such as herein disclosed so that when the broaching slides 15 and 16 are moved by their hydraulic cylinders 19 alternately to their Up positions and alternately on their broaching strokes to their Down positions, their corresponding work carrying slides 25 and 26 are moved by the double acting hydraulic cylinder 38 and the mechanism hereinbefore described alternately into and out of their broaching positions where they remain during the alternate broaching or Down strokes of the respective broaching slides 15 and 16.

In a single ram broaching machine having a single work carrying slide, a suitable hydraulic circuit would be employed to cause one hydraulic cylinder 19 and the double acting cylinder 38 to reciprocate a broaching slide 16 and one work carrying slide 26 respectively in the required sequence, in which event, the piston rod extension 400 may be eliminated since the double acting cylinder 38 need not be hydraulically balanced.

In either double ram or single ram broaching machines, the hydraulic fluid under pressure applied to the double acting cylinder to move a work carrying slide into broaching position is maintained during the entire cutting stroke of the broach.

Figure 2:
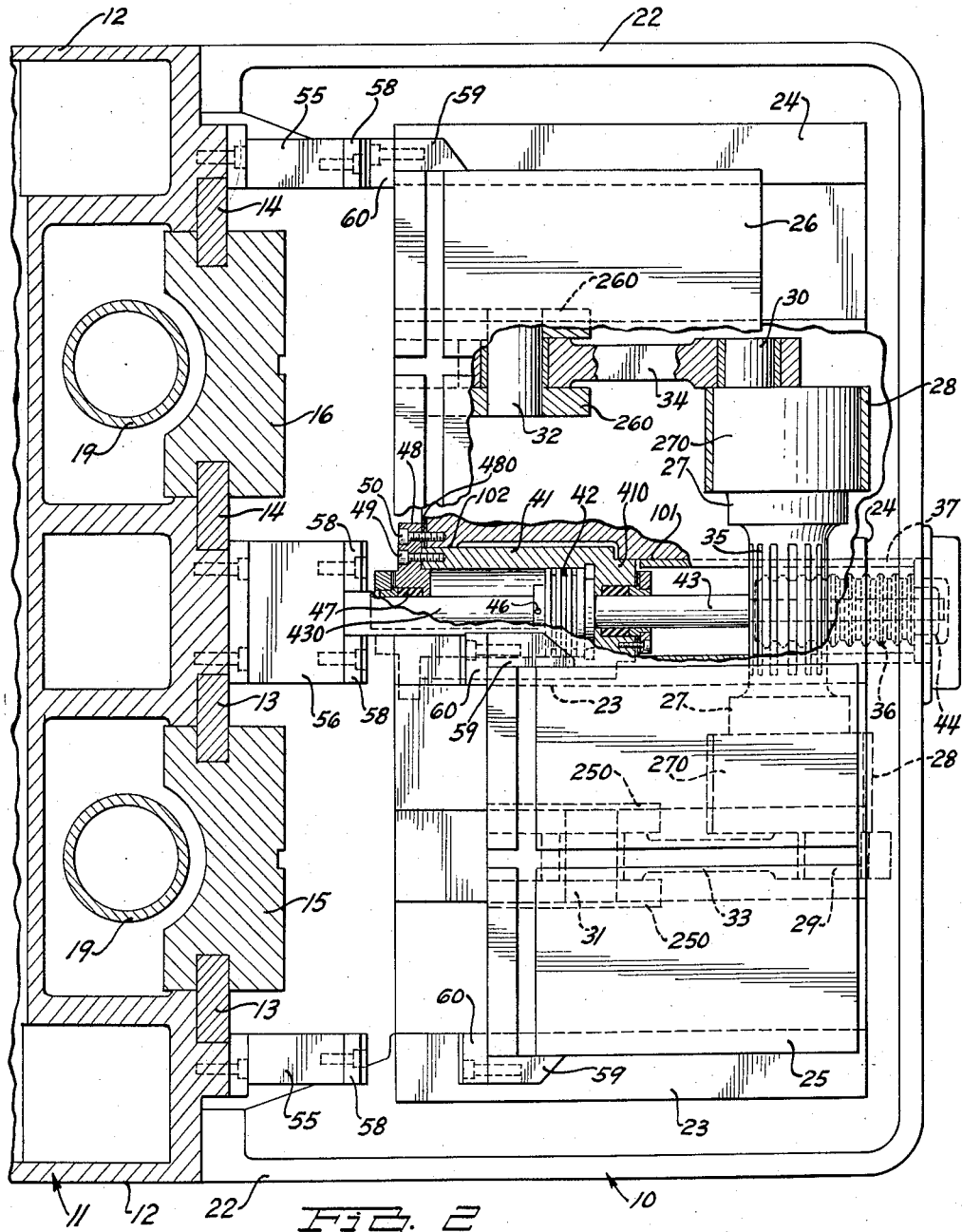
Fig. 2 is a horizontal sectional view taken on the line 2—2 of Fig. 1 with parts broken away to disclose the improved work carrying slide operating mechanism.
Figure 3:
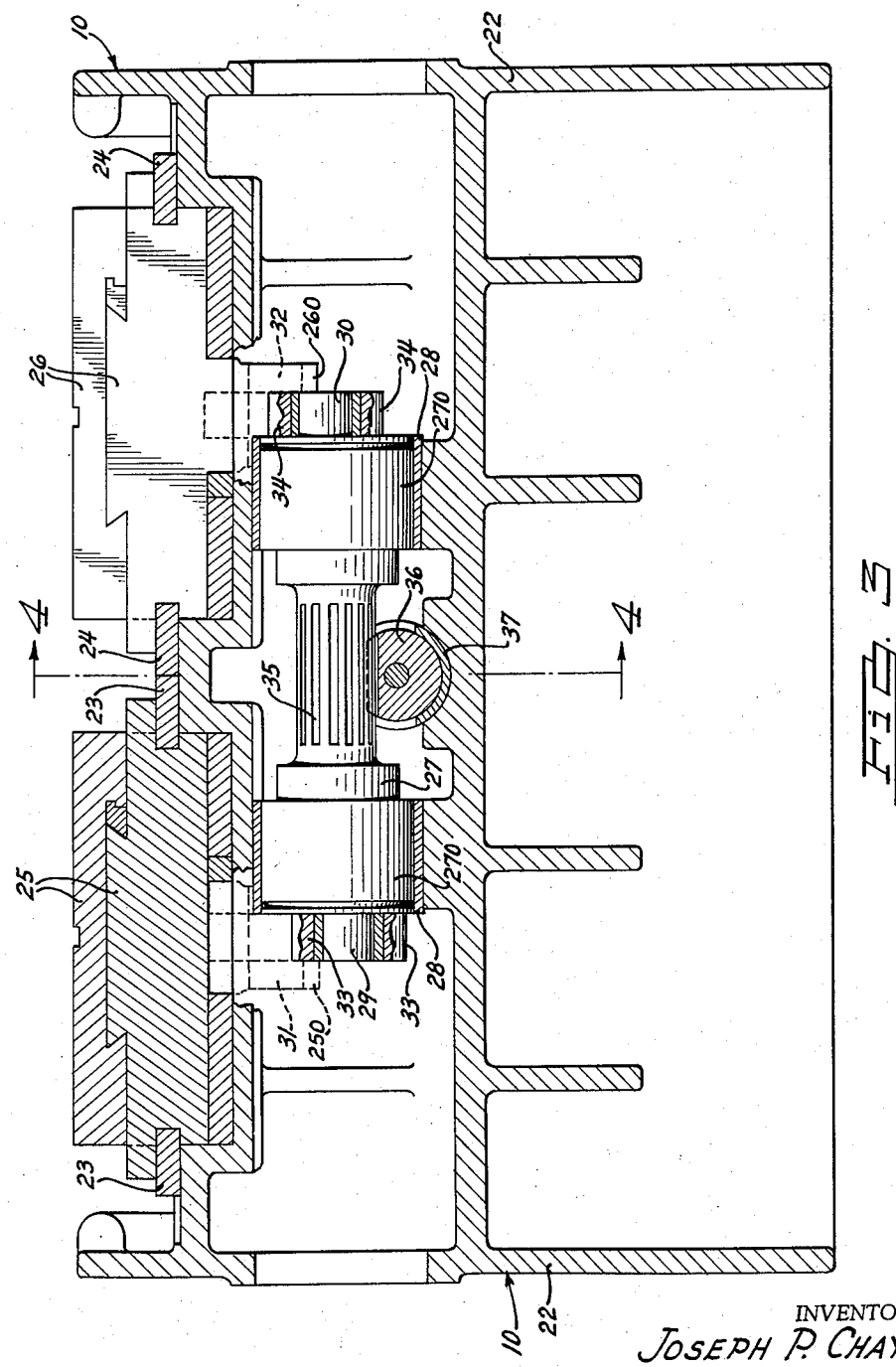
Fig. 3 is a vertical sectional view taken substantially on the line 3—3 of Fig. 1.

Referring now particularly to Figs. 1, 2 and 4, stop brackets 55 and 56 are secured to the frame 12 of the broaching machine 11. The brackets 55 are single brackets and have one stop 58 fixed on the outer end of each of them. The bracket 56 is a double bracket and has two stops 58 fixed on the outer end thereof. The work carrying slides 25 and 26 are each preferably provided with a pair of brackets 59 at the corners thereof facing the machine frame 12, and each bracket 59 has a stop 60 fixed on the end thereof.

Opposite stops 58 and 60 are so adjusted with respect to each other that, when a work carrying slide 25 or 26 is moved into its broaching position by the double acting hydraulic cylinder 41 and the mechanism hereinbefore described in detail, the said stops 58 and 60 become engaged prior to arrival of the work carrying slide 25 or 26 to its broaching position as determined by the extent of travel of the piston 42, piston rod 43 and rack 36 as a unit as hereinbefore described. Further movement of a work carrying slide 25 or 26 into its broaching position after engagement of the said stops 58 and 60 pre-stresses or pre-loads knee construction and work carrying slide mechanism against the push-off component of the cutting force of the broach 18 when exerted on the work W which is clamped or otherwise secured in a suitable manner to the work carrying slide 25 or 26. The adjustment of the said stops 58 and 60 with respect to each other and the extent of travel of the work carrying slides 25 and 26 after the said stops come into contact with each other determines the extent to which the knee construction and the work carrying slide mechanism is pre-loaded or pre-stressed against the said push-off component force of the broach during the broaching of work fixed on said work carrying slides.

Because of the fact that fluid under pressure applied to the double acting hydraulic cylinder 41 to move a work carrying slide 25 or 26 into its broaching position is maintained in the said hydraulic cylinder 41 during the broach cut on work carried by said slides, pre-loading of the entire knee construction including the work carrying slides and the work carrying slide operating mechanism against the said push-off component of the cutting force of the broaching tool is fully maintained during the broaching cuts. Furthermore, inasmuch as the work carrying slide operating mechanism is limited to moving the work carrying slides 25 and 26 to and from broaching position without transverse sliding conections and without ever assuming a dead center position, all possibilities of the work tables becoming locked or wedged in their broaching or retracted positions are eliminated.

Although but a single specific embodiment of the invention has been disclosed and described in detail in connection with a dual ram surface broaching machine having dual work carrying slides, it is obvious that the invention may be readily adapted to single ram and other types of machines, and that many changes may be made in the size, shape, arrangement and detail of the various elements of the invention, all without departing from the spirit and scope thereof as defined by the appended claims.

I claim:

1. In a surface broaching machine including a frame, a broaching slide carrying a broach thereon reciprocable in said frame to accomplish alternately a cutting stroke and return stroke of said broach, knee construction comprising a knee fixed to said frame including a work carrying slide disposed normal to said broaching slide adapted to support and carry work fixed thereon into and out of broaching position with respect to said broach, the broaching force transmitted from said broach to said work during its cutting stroke being resolved into a cutting component resisted by the work carrying slide in supporting said work and a push-off component which urges said work carrying slide away from the path of said broach, the combination of a crankshaft including a crank thereon journaled in said knee disposed normal to the direction of movement of the work carrying slide and parallel to the plane of travel thereof, a wrist pin on said work table disposed parallel to said shaft, a linkage bar pivoted to said crank and to said wrist pin, a pinion formed on said shaft and a rack slidably mounted in said knee meshed with said pinion, a double acting hydraulic cylinder mounted in said knee in alignment with the axis of movement of said rack including a piston connected to said rack applying torque to and reciprocably turning said crankshaft an angular distance less than 180 degrees to move said work carrying slide and work thereon into and out of broaching position, means limiting the stroke of the piston of said hydraulic cylinder whereby to limit the movement of said crank and linkage bar short of dead center position when said work carrying slide is moved to its broaching position, and a stop means on said frame engageable by cooperating stop means on said work carrying slide prior to the completion of the said movement thereof into broaching position whereby continued movement of said work carrying slide into its broaching position pre-stresses the knee and said work carrying slide mechanism against said push-off component force, the said hydraulic cylinder being adapted to maintain torque on said crankshaft when said work carrying slide and work thereon is in its broaching position whereby to maintain said pre-stressed condition of said knee and said work carrying slide mechanism during broaching of said work.

2. A surface broaching machine as claimed in claim 1 including two broaching slides reciprocable simultaneously in opposite directions, two work carrying slides each fitted with a wrist pin, two angularly related cranks on said crankshaft, and two linkage bars each pivotally connecting one of said cranks to one of said work carrying slides whereby said reciprocable turning of said crankshaft said angular distance less than 180 degrees moves said work carrying slides alternately into and out of broaching position with respect to one of said broaching slides.

3. In a broaching machine as claimed in claim 1 wherein the means limiting the stroke of the piston of said hydraulic cylinder and the movement of said crank and linkage bar short of dead center in either direction of travel thereof consists of slidably mounting said hydraulic cylinder in said knee, providing adjustable stop means mounted on said knee limiting the movement of said rack and said piston connected thereto in one direction, and providing a combined end cap and mounting plate for said hydraulic cylinder locating and fixing said hydraulic cylinder in said knee in respect to said adjustable stop means whereby to limit the movement of said piston and rack connected thereto in the other direction.

References Cited in the file of this patent

UNITED STATES PATENTS

| | | |
|---|---|---|
| 2,190,642 | Ferris | Feb. 20, 1940 |
| 2,274,191 | Davis | Feb. 24, 1942 |
| 2,372,825 | Grad | Apr. 3, 1945 |
| 2,405,434 | Krainer | Aug. 6, 1946 |